April 22, 1969  N. C. KAUFMAN  3,439,526
MEASURING DEVICE

Filed Nov. 15, 1965  Sheet 1 of 2

INVENTOR.
NORMAN C. KAUFMAN
BY J. L. Chisholm
ATTORNEY

INVENTOR.
NORMAN C. KAUFMAN
BY J. P. Chisholm
ATTORNEY

United States Patent Office 3,439,526
Patented Apr. 22, 1969

1

3,439,526
MEASURING DEVICE
Norman C. Kaufman, Hazel Park, Mich., assignor to Earl A. Thompson Manufacturing Co., Ferndale, Mich., a corporation of Michigan
Filed Nov. 15, 1965, Ser. No. 507,769
Int. Cl. G01m 3/02
U.S. Cl. 73—37.9   8 Claims

ABSTRACT OF THE DISCLOSURE

A gaging system for use with conventional pneumatic gage heads in which air pressure is discharged through the head and in which the pressure near the head measures a specimen by indicating rate of flow produced by the difference in size between the gage head and the article to be measured. A mercury manometer responds to the pressure to be measured, transmitted by a flexible diaphragm which in its extreme positions fits accurately against one concave surface of a lenticular reservoir for the mercury. The diaphragm in its extreme position, combined with grooves in the concave surfaces of the reservoir, radiating from a central opening prevents bubbles of air being trapped between the diaphragm and the bottom of the reservoir at the lowest pressure in the system and prevents drops of mercury being separated from the main body of mercury and trapped between the diaphragm and the top of the reservoir at high pressure. The volume of mercury is less than the volume of the manometer tube. Vacuum exerts a braking action on momentum travel of the mercury in the event of sudden increase of pressure to the maximum, for example by clogging of the gage head. This reduces splashing of the mercury and contamination of the system with mercury. A valve between the reservoir and the manometer tube allows rapid filling of the tube and slows emptying.

---

This invention relates to air operated gaging devices for measuring or indicating a characteristic such as a dimension of an article which it is desired to measure or detect. An example of the field in which the invention lies is in the patent to Van Deberg, 3,029,629, Apr. 17, 1962, the disclosure of which is incorporated herein by reference.

One use for such devices is to measure rapidly and with extreme accuracy the diameter of a precision-formed part such as a cylinder. The part to be measured is inserted in a gage head having an accurately formed internal cylinder of such a size that a very small clearance is established between the part to be measured and the gage head. Air under pressure is supplied at a definite rate into the gage head and escapes through the clearance between the gage head and the part being measured. The pressure developed in the supply line is a measure of the cross section of the escape opening and hence, by reference to the known size of the gage head, is a measure of the part to be tested.

Parts to be measured are fed to the gage head and removed therefrom in rapid succession. The stabilized pressure in the air supply passage, when a part is in place in the gage head is read or recorded in any suitable manner. This may be done by a mercury manometer in pressure communicating relationship with the supply line but not in fluid communication therewith, fluid communication being prevented by a flexible diaphragm which is senstive to small changes in pressure.

While devices of the character disclosed in the Van Deberg patent referred to are quite successful in accurately and rapidly measuring desired characteristics of various parts, I have discovered ways in which the speed of operation, accuracy and reliability of such devices may be improved.

It is important that articles be measured rapidly so that the device can be used for inspection of every one of large numbers of mass produced parts. This requires quick movement of the mercury into the manometer tube and heretofore has resulted in undesirably fast movement out of the tube with resultant sudden stopping of the mercury in the reservoir and in the tube. This causes hammering and splashing of the mercury in the tube, accompanied by the formation of very fine drops of mercury which adhere to the wall of the tube, connect electrically the read-out contacts and give an erroneous pressure indication.

Consequently it is an object of the invention to control the flow of mercury into and out of the tube so as to prevent violent movement and the formation of drops.

It is particularly an object to flow the mercury rapidly into the tube to take the measurement quickly when a part is inserted in the gage head, and to require the mercury to flow out slowly during the time one part is being removed and another inserted. This prevents hammering and splashing.

It is particularly an object to provide an improved flow control valve which is especially adapted to be used in mercury, and which moves rapidly and reliably between open and closed positions.

It sometimes happens, due to accident, such as blocking of the exit opening in the gage head, that an extraordinarily high pressure suddenly forces the mercury out of the reservoir and into the tube. This forces or splashes mercury out of the tube into the system and contaminates the entire apparatus. It has been proposed to avoid this undesirable result either by building a reservoir at the top of the tube which it was hoped would trap excess mercury, or to put filters between the tube and the rest of the system. It has been found that mercury gets into the system in spite of these measures.

Consequently it is among the objects of the invention to have the volume of the tube not less than, and preferably greater than, the volume of the mercury in the system, and so to construct the reservoir that when all the mercury has been expressed therefrom, the pressure of the air in the system automatically and effectively prevents further movement of the mercury.

With reservoirs of the type heretofore known difficulty has been experienced in obtaining uniform performance or flexing of the diaphragm and this results in inaccuracy and inconsistent readings.

Consequently it is an object of the invention to provide a reservoir and diaphragm arrangement in which pockets of air, or of mercury, cannot form between the diaphragm and the walls of the reservoir and the diaphragm will fit snugly against either wall, expressing all mercury, or all air, out of the reservoir, as the case may be.

The foregoing objects and other objects of the invention will be apparent from the following description and from the accompanying drawings in which.

Figure 1:
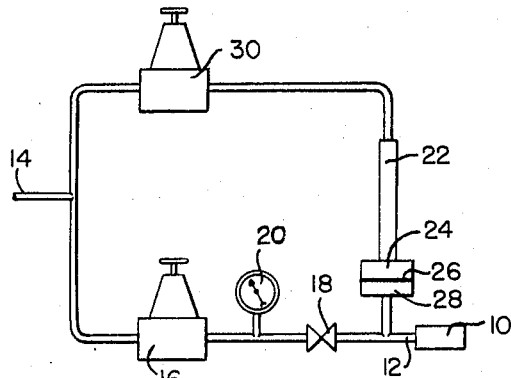
FIG. 1 is a diagram of a pressure supply and gaging system with which my invention is to be used.

Referring first to FIG. 1 a gage head 10 may be a standard known air calipering ring or tube into which an article to be measured is inserted to form a fixed discharge orifice between the article and the tube through which air escapes after being supplied thereto by a conduit 12. Air under pressure is supplied from any suitable source 14 through any known constant pressure reducing valve 16 and through a calibrated orifice 18. The gage 20 may indicate output pressure of the reducing valve. A manometer 22 has its lower end in pressure responsive connection with the conduit 12 so that the height of mercury in the tube is a measure of the pressure in this conduit. This is accomplished by having the lower end of the tube in communication with a pool of mercury confined in the upper half 24 of the mercury reservoir by a flexible diaphragm 26. The portion 28 of the reservoir below the diaphragm is in open communication with the duct 12. The upper end of the manometer is under constant pressure from a reducing valve 30 the high pressure side of which is connected to the air supply 14. Ordinarily under stable conditions there is no air flow between the low pressure side of this reducing valve and the upper end of the manometer.

Except for the form and arrangement of the reservoir 24 28, the diaphragm 26 and the flow control valve to be described, all of which are particularly designed to carry out the objects of the invention, the apparatus as so far described may be constructed as disclosed in the Van Deberg patent referred to and any suitable known pressure read-out and recording devices may be used, activated by electrical contacts in the manometer tube.

The remaining figures of the drawing and the following description disclose forms of the invention which are illustrative only, of examples of embodiments of the invention.

Figure 2:
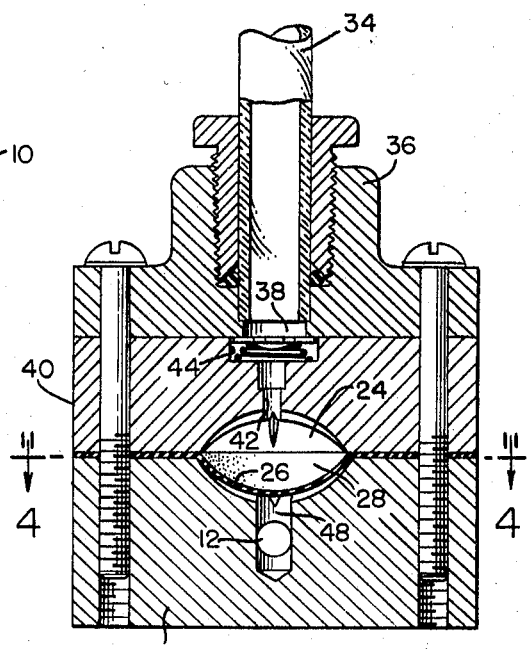
FIG. 2 is a vertical section of a portion of apparatus embodying one form of the invention and including the reservoir, manometer tube, diaphragm, and flow control valve.
Figure 3:
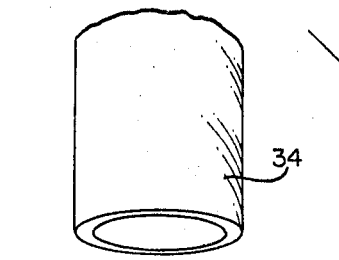
FIG. 3 is an enlarged exploded perspective view of one form of flow control valve and its associated parts.
Figure 4:
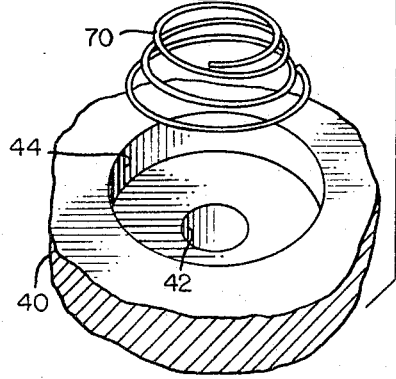
FIG. 4 is a reduced scale section on 4—4 of FIG. 2 showing in plan the lower half of the reservoir below the diaphragm.
Figure 4:
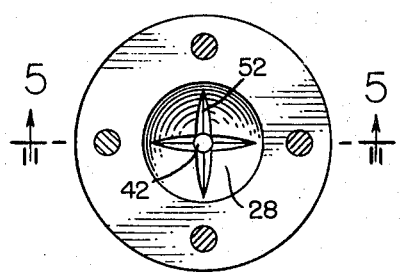
Figure 5:
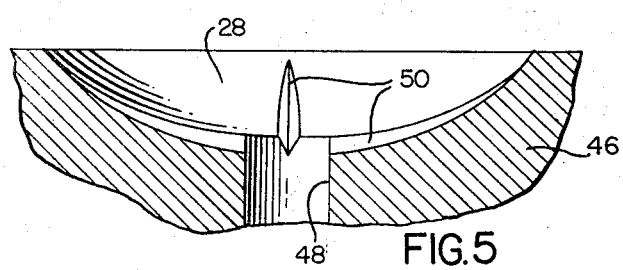
FIG. 5 is an enlarged section on 5—5 of FIG. 4.
Figure 6:
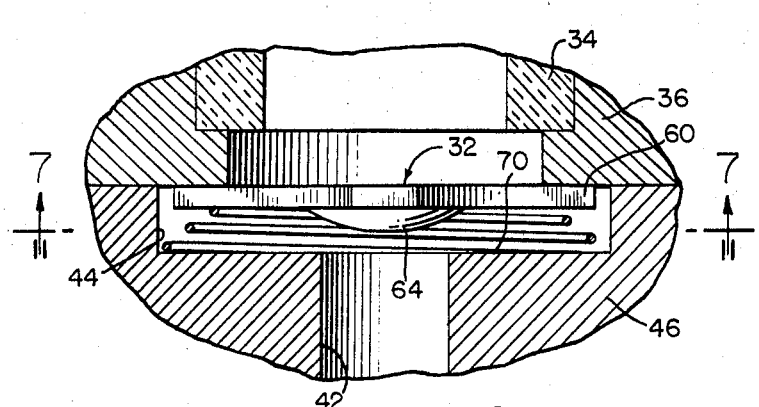
FIG. 6 is a greatly enlarged section corresponding to FIG. 2, showing the valve chamber containing one form of flow control valve and spring.
Figure 7:
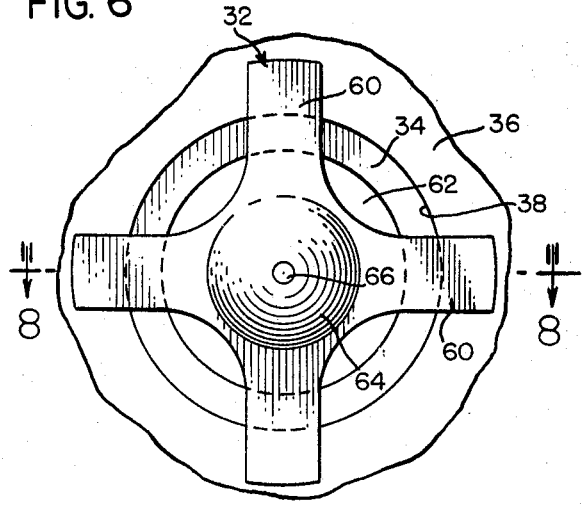
FIG. 7 is a bottom plan view of the form of valve shown in FIG. 6, as seen from the plane represented by the line 7—7 in FIG. 6.
Figure 8:
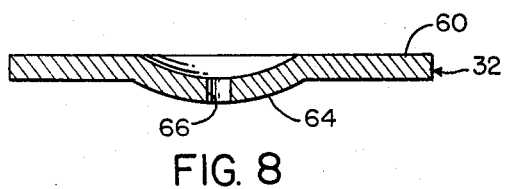
FIG. 8 is a section of the valve on the line 8—8 of FIG. 7.

Referring particularly to FIGS. 2, 3 and 6, in addition to the reservoir 24–28 and the diaphragm 26 of the form shown in FIGS. 2, the invention includes a flow control valve 32 which may be of a form shown in FIGS. 3, 6, 7, and 8, for permitting the mercury to flow rapidly into the tube and to require it to flow out slowly.

A glass manometer tube 34 may be sealed at its lower end in an upper block 36 having a central opening or passage 38 for communicating with the reservoir. A central block 40 has the upper concave chamber 24 of the reservoir formed in its lower face and this reservoir chamber is open to a passage 42 at its center formed in the block which is part of a valve chamber 44 in the upper face of the block 40 which is designed to register with the opening 38 in the upper block 36 to establish communication between the tube and reservoir. A third block 46 has the lower concave chamber 28 of the reservoir formed in its upper face and this chamber is open to a central pasage 48 which communicates with the air supply passage 12 to the gaging head 10. The three blocks are assembled as shown in FIG. 2 with the valve chamber 44 in alignment with the tube 34, with the chambers 24 and 28 registering with each other to form a lenticular reservoir and with the diaphragm 26 sandwiched between the blocks 40 and 46.

The diaphragm is made of any suitable known material such as a rubber-like plastic sheet which bends and/or stretches in response to slight differences in pressure so that when there is no pressure in the passage 12 the mercury holds the diaphragm snugly in contact with the bottom concave wall of the reservoir. In order to prevent the entrapment of any air bubbles or pockets below the diaphragm and to assure that all air is expressed from the reservoir into the passage 48, the wall of the lower chamber 28 of the reservoir is provided with grooves 50 extending from the central opening 48 toward the edges of the concave wall. Similarly the diaphragm 26 is intended to fit snugly against the concave wall of the upper chamber 24 of the reservoir whenever excessive air pressure in the conduit 12 forces all of the mercury out of the reservoir. The upper wall of the chamber 24 is also provided with grooves 52 (see FIG. 2) extending from the central opening 42 toward the edges of the concave wall. This assures that substantially all of the mercury will be expressed from the upper chamber of the reservoir in the event that excess pressure develops in the passage 12.

One purpose of this arrangement is to brake or retard movement of the mercury due to momentum when such excess pressure quickly forces substantially all of the mercury out of the reservoir. The quantity of mercury in the system is such that all of it can be contained within the tube 34 and the passage formed by the valve chamber 44 and the duct 42 whenever the diaphragm 26 is forced up into snug engagement with the wall of the upper chamber 24. Preferably this volume of mercury is appreciably less than the sum of the volumes of the tube 34 and the volume of the valve chamber or passage 42–44, but in any event the volume of mercury must not be greater than the sum of these volumes. When any excess pressure forces all of the mercury out of the chamber 24 the mercury is moving rapidly. Consequently unless some means were provided to prevent it the mercury could travel by momentum out of the upper end of the manometer tube and so could contaminate the system. The particular arrangement of the diaphragm and the formation of the wall of the upper chamber prevents this and brakes or retards the movement of the mercury. As soon as the diaphragm has snugly fitted into the upper wall any further movement of the mercury would necessarily tend to create a vacuum in the valve chamber 42–44. This causes the air pressure above the top of the mercury column to exert a strong braking action to stop movement of the mercury and prevent spurting out of the top of the tube.

Forms of the flow control valve embodying the invention are best shown in FIGS. 3 and 6 to 9. Referring to FIGS. 3 and 6 to 8, the valve 32 may embody four radial arms 60 which support the valve on the block 36 around the central opening 38 when the valve is in the open position as shown in FIG. 6. The spaces 62 between the arms 60 allow unrestricted flow of mercury from the reservoir 24–28 whenever pressure increases in the conduit 12. When the valve is in closed position it rests on or near the upper end of the passage 42 to restrict flow out of the tube 34 into the reservoir when the pressure in the passage 12 decreases. Preferably the valve rests on the end of the passage 42 and the center of the valve has an embossed portion 64 to close the end of this passage. The center of the valve is provided with a hole 66 of predetermined size which permits flow through the valve at the desired rate.

The construction and arrangement of the valve has presented difficult problems. The quantity of mercury in the system must be small in order to reduce its inertia as much as possible. This not only requires a small reservoir 24–28 but it requires the valve chamber to be very small. This results in a delicate valve which must nevertheless operate quickly and reliably. The operation of a valve in mercury presents further problems. Ordinarily the material of which the valve would be made floats in mercury. This would tend to keep the valve normally in its open position, which is desirable. However if the valve is made of a material which is not wetted with mercury it has been found that the surface tension of the mercury tends to prevent the mercury from flowing under the valve after it has once closed, and the weight of the column holds the valve closed. This requires a spring to urge the valve open and to assist the mercury in getting under the valve. It is difficult to make a reliable spring which can be confined in such a small space and which will lie flat under the valve and allow it to close. On the other hand if the valve is made of material which is wetted by mercury it is not necessary to have the spring. But material which is wetted tends to form an amalgam which has been found to contaminate the manometer tube and electrically connect the read-out contacts and give a false reading. Each has its advantages and disadvantages.

If the valve is formed as shown in FIG. 6, when the embossed center seats against the end of the passage 42 the arms 60 may be far enough above the bottom of the valve chamber to let the mercury flow under the arms in spite of its very high surface tension. In such case the valve may be made of material which does not wet with mercury for example steel finished with a black oxide surface, and there is no need for a spring. However if the mercury does not flow beneath the valve due to its surface tension I prefer to use a spring 70. This must be no thicker than about 0.005 inch and is preferably formed of piano wire coiled into a conical helix, as indicated in FIG. 6, which will be perfectly flat when compressed. This allows the arms 60 to approach the bottom of the valve chamber enough to let the central embossed portion of the valve seat against the passage 42.

Figure 9:
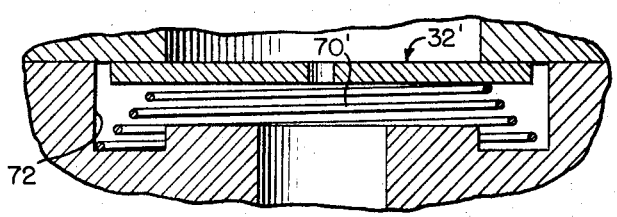
FIG. 9 is a section corresponding to FIG. 6 showing an alternative form of valve and spring.

Alternatively the valve may be constructed as shown in FIG. 9 without any embossed portion. In such case the valve is intended to lie flat against the bottom of the valve chamber to close the passage 42. In such case a recess 72 may be provided to house the spring and the spring 70' may be formed in order to lie entirely within this recess when the valve is closed.

Alternatively the valve, formed as shown in FIG. 9, may be of a material which is wetted by mercury, and the spring may be omitted.

In operation whenever a part to be measured is inserted in the gage head 10 the pressure in the tube 12 immediately increases and the diaphragm, exposed on its lower side to this pressure, pushes the mercury out of the reservoir rapidly into the manometer tube 34 where its height indicates the pressure in the conduit 12 which is an accurate measure of the size of the escape orifice and so is a measure of the part being gaged. It is important that this happen quickly so that the characteristic of the part may be read or recorded practically instantly. Then the part is ejected from the gage head and a new part is inserted. During the time between the ejection of the part measured and the insertion of the next part to be measured the mercury can flow slowly into the reservoir without any violent motion which would cause the disadvantages enumerated above. This slow flow is enforced by the valve which is closed by the flow of the descending mercury and held closed until the mercury has substantially filed the reservoir. Then the valve, if it is equipped with a spring is immediately raised to its open position, or if the valve is not provided with a spring the valve floats upward into open position.

I claim as my invention:

1. A gaging device comprising in combination an air gaging head, means forming a first passage for supplying gas under pressure to the head, a lenticular reservoir for containing mercury and having concave upper and lower walls, a flexible diaphragm dividing the reservoir into upper and lower chambers and adapted to fit snugly against either concave wall, a vertically extending manometer tube for a column of mercury above the reservoir, the tube communicating with the upper chamber through a second passage at the center of the upper wall which second passage includes a valve chamber, means forming a third passage connecting the center of the lower wall to the first passage, there being grooves in both walls of the reservoir extending from the central passages toward the periphery of the walls, a valve in the valve chamber which permits rapid flow from the reservoir to the column and retards flow from the column to the reservoir, said valve being constituted and arranged to assist the flow of mercury beneath the valve, the volume of the reservoir being of the order of the volume of the tube and not greater than the volume of the tube plus the volume of the second passage, and the upper chamber of the reservoir being closed, except for communicating with the manometer tube.

2. An air gaging device comprising in combination an air gaging head, means forming a first passage for supplying gas under pressure to the head, a reservoir containing mercury, a flexible diaphragm dividing the reservoir into upper and lower chambers, a vertically extending tube for a column of mercury above the reservoir and communicating with the upper chamber, means forming a passage connecting the lower chamber to the first passage, means including a valve chamber forming a passage between the upper chamber and the column, a valve formed of material not wetted by mercury in the valve chamber which permits rapid flow from the chamber to the column and retards flow from the column to the chamber, said valve chamber extending radially beyond the valve, and a spring between the valve and the bottom of the valve chamber for assisting mercury to flow between the valve and bottom of the valve chamber.

3. Apparatus as defined in claim 2 in which the spring is conical, lies flat between the valve and the bottom of the valve chamber when there is no pressure in the first-named passage and the thickness of the spring lets the valve approach the bottom of the valve chamber close enough to provide a restricted orifice retarding downward flow of the mercury.

4. An air gaging device comprising in combination an air gaging head, means forming a first passage for supplying gas under pressure to the head, a lenticular reservoir having upper and lower concave walls for containing liquid, a flexible diaphragm adapted to fit either wall snugly and dividing the reservoir into upper and lower chambers, a tube for a column of liquid extending vertically above the center of the reservoir and communicating with the upper chamber, means forming a passage connecting the lower chamber to the first passage, means including a valve chamber forming a passage between the center of the upper chamber and the column, a valve in the valve chamber which permits rapid flow from the chamber to the column and retards flow from the column to the chamber, and means forming substantially horizontal grooves in the upper wall extending radially from the center of the upper wall.

5. An air gaging device comprising in combination an air gaging head, means forming a first passage for supplying gas under pressure to the head, a lenticular reservoir having upper and lower concave walls for containing liquid, a flexible diaphragm adapted to fit either wall snugly and dividing the reservoir into upper and lower chambers, a tube for a column of liquid extending vertically above the center of the reservoir and communicating with the upper chamber, means forming a passage connecting the center of the lower chamber to the first passage, means including a valve chamber forming a passage between the center of the upper chamber and the column, a valve in the valve chamber which permits rapid flow from the chamber to the column and retards flow from the column to the chamber, and means forming substantially horizontal grooves in the lower extending radially from the center passage.

6. An air gaging device comprising in combination an air gaging head, means forming a first passage for supplying gas under pressure to the head, a reservoir containing mercury, a flexible diaphragm dividing the reservoir into upper and lower chambers, a vertically extending tube for a column of mercury above the reservoir and communicating with the upper chamber, means forming a passage connecting the lower chamber to the first passage, means including a valve chamber forming a passage between the upper chamber and the column, and a valve formed of material wetted by mercury in the valve chamber which permits rapid flow from the chamber to the column and retards flow from the column to the chamber, said valve chamber extending radially beyond the valve.

7. An air gaging device comprising in combination an air gaging head, means forming a first passage for supplying gas under pressure to the head, a reservoir containing mercury, a flexible diaphragm dividing the reservoir into upper and lower chambers having upper and lower walls, the diaphragm being adapted to fit snugly against the upper wall, a vertically extending tube of substantially uniform cross section for a column of mercury above the reservoir and communicating with the upper chamber, means forming a passage connecting the lower chamber to the first passage, means including a valve chamber forming a passage between the upper chamber and the column, and a valve in the valve chamber which permits rapid flow from the chamber to the column and retards flow from the column to the chamber, the volume of the mercury in the system being not greater than the volume of the tube.

8. An air gaging device comprising in combination an air gaging head, means forming a first passage for supplying gas under pressure to the head, a reservoir containing mercury, a flexible diaphragm dividing the reservoir into upper and lower chambers having upper and lower walls, the idaphragm being adapted to fit snugly against the upper wall, a vertically extending tube of substantially uniform cross section for a column of mercury above the reservoir and communicating with the upper chamber, means forming a passage connecting the lower chamber to the first passage, means including a valve chamber forming a passage between the upper chamber and the column, and a valve in the valve chamber which permits rapid flow from the chamber to the column and retards flow from the column to the chamber, the volume of the mercury in the system being not greater than the volume of the tube plus the volume of the passage connecting the tube to the reservoir.

References Cited

UNITED STATES PATENTS

| | | | |
|---|---|---|---|
| 3,029,629 | 4/1962 | Deberg | 73—37.5 |
| 3,046,778 | 7/1962 | Fortier | 73—37.5 |
| 3,177,707 | 4/1965 | Whyte | 73—119 |

LOUIS R. PRINCE, *Primary Examiner.*

WM. HENRY II, *Assistant Examiner.*

U.S. Cl. X.R.

73—392, 401